(12) United States Patent
D'sa

(10) Patent No.: US 10,181,058 B2
(45) Date of Patent: Jan. 15, 2019

(54) TECHNIQUES FOR RECOVERING MISSING DEVICES

(71) Applicant: Dropbox, Inc., San Francisco, CA (US)

(72) Inventor: Cailen D'sa, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 15/616,939

(22) Filed: Jun. 8, 2017

(65) Prior Publication Data

US 2017/0270322 A1    Sep. 21, 2017

Related U.S. Application Data

(62) Division of application No. 13/855,503, filed on Apr. 2, 2013, now Pat. No. 9,710,678.

(51) Int. Cl.
*G06F 21/88* (2013.01)

(52) U.S. Cl.
CPC .................................. *G06F 21/88* (2013.01)

(58) Field of Classification Search
CPC ..................... H04M 1/72527; G06Q 20/363
See application file for complete search history.

(56) References Cited

U.S. PATENT DOCUMENTS

| | | | | |
|---|---|---|---|---|
| 6,775,485 B1 * | 8/2004 | Maurer | .................. | G03G 15/50 399/111 |
| 6,813,498 B1 * | 11/2004 | Durga | .................. | H04W 68/00 340/568.1 |
| 8,091,795 B1 | 1/2012 | McLellan et al. | | |
| 8,200,582 B1 * | 6/2012 | Zhu | ...................... | G06Q 20/382 705/51 |
| 8,326,669 B2 * | 12/2012 | Korupolu | ............ | G06F 11/0793 705/7.11 |
| 8,396,453 B2 * | 3/2013 | Snow | ...................... | G01S 19/09 340/6.11 |
| 9,135,398 B2 * | 9/2015 | Kaib | ................... | G06F 19/3418 |

(Continued)

OTHER PUBLICATIONS

MacRumors Forums, "Require Password to Power Off" last accessed on Jan. 28, 2014, search forums, 6 pages.

(Continued)

*Primary Examiner* — Joseph P Hirl
*Assistant Examiner* — Sayed Aresh Beheshti Shirazi
(74) *Attorney, Agent, or Firm* — Hickman Palermo Becker Bingham LLP

(57) ABSTRACT

Techniques are provided for assisting owners to recover missing devices. The missing device automatically performs certain actions proactively in response to detecting conditions that indicate that the device has been lost or stolen. Conditions that indicate the device has been lost or stolen ("triggering conditions") may include that a password failure has occurred more than a predetermined number of times. Any number and type of recovery-assisting actions may be taken, in response to triggering conditions, to assist owners in recovering a missing device. For example, a device may generate a record that indicates the current location of the device, and synchronize the record with an online service or some other device. The generation and synchronization of such records may be repeated on a periodic basis until either (a) the device becomes disabled, or (b) a user enters an appropriate password.

20 Claims, 4 Drawing Sheets

(56) References Cited

U.S. PATENT DOCUMENTS

| | | | |
|---|---|---|---|
| 9,146,704 B1* | 9/2015 | Lin | H04W 12/12 |
| 2003/0208743 A1* | 11/2003 | Chong | G06F 8/10 |
| | | | 717/106 |
| 2004/0117310 A1* | 6/2004 | Mendez | G06F 21/62 |
| | | | 705/50 |
| 2005/0096102 A1* | 5/2005 | Mock | H04W 52/0235 |
| | | | 455/574 |
| 2005/0220080 A1* | 10/2005 | Ronkainen | H04L 41/082 |
| | | | 370/352 |
| 2005/0226468 A1* | 10/2005 | Deshpande | H04M 1/66 |
| | | | 382/115 |
| 2006/0154692 A1* | 7/2006 | Ikehara | G06Q 90/00 |
| | | | 455/556.2 |
| 2007/0043478 A1 | 2/2007 | Ehlers et al. | |
| 2007/0249322 A1* | 10/2007 | Benco | G06F 21/88 |
| | | | 455/410 |
| 2007/0294529 A1* | 12/2007 | Blair | G06F 21/6218 |
| | | | 713/160 |
| 2008/0132245 A1* | 6/2008 | Snow | G01S 19/09 |
| | | | 455/456.1 |
| 2009/0075630 A1* | 3/2009 | McLean | G06F 21/602 |
| | | | 455/411 |
| 2009/0099679 A1* | 4/2009 | Sandoval | B29C 45/768 |
| | | | 700/110 |
| 2010/0099383 A1* | 4/2010 | Yamagishi | H04M 1/673 |
| | | | 455/411 |
| 2010/0229220 A1* | 9/2010 | Tsai | G06F 21/88 |
| | | | 726/4 |
| 2010/0304828 A1 | 12/2010 | Bettcher | |
| 2011/0010761 A1* | 1/2011 | Doyle | G06F 21/6218 |
| | | | 726/5 |
| 2011/0046799 A1 | 2/2011 | Imes et al. | |
| 2011/0047421 A1* | 2/2011 | Schuette | G11C 16/349 |
| | | | 714/718 |
| 2011/0072520 A1* | 3/2011 | Bhansali | G06F 21/572 |
| | | | 726/27 |
| 2011/0291834 A1* | 12/2011 | Boldyrev | G06F 12/1416 |
| | | | 340/572.1 |
| 2011/0302660 A1* | 12/2011 | Mahalingaiah | G06F 21/31 |
| | | | 726/28 |
| 2011/0307835 A1* | 12/2011 | Lim | H04M 1/72544 |
| | | | 715/838 |
| 2011/0319051 A1* | 12/2011 | Reitnour | G01S 19/17 |
| | | | 455/404.2 |
| 2012/0188064 A1* | 7/2012 | Mahaffey | H04L 63/1441 |
| | | | 340/384.1 |
| 2012/0203379 A1 | 8/2012 | Sloo et al. | |
| 2012/0317651 A1* | 12/2012 | Saito | G06F 21/88 |
| | | | 726/27 |
| 2013/0086672 A1* | 4/2013 | Sung | G06F 21/31 |
| | | | 726/18 |
| 2013/0111379 A1* | 5/2013 | Hong | G06F 3/04883 |
| | | | 715/764 |
| 2013/0254567 A1* | 9/2013 | Zhang | G08C 23/04 |
| | | | 713/310 |
| 2014/0006253 A1* | 1/2014 | Nuzzi | G06Q 40/02 |
| | | | 705/38 |
| 2014/0019319 A1* | 1/2014 | Derby | G06Q 10/0639 |
| | | | 705/30 |
| 2014/0024348 A1* | 1/2014 | Hurst | H04M 3/5232 |
| | | | 455/414.1 |
| 2014/0040482 A1* | 2/2014 | Wong | H04W 4/80 |
| | | | 709/227 |
| 2014/0093231 A1* | 4/2014 | Fisher | H04B 10/03 |
| | | | 398/2 |
| 2014/0146171 A1* | 5/2014 | Brady | H04N 7/188 |
| | | | 348/143 |
| 2014/0148120 A1* | 5/2014 | Buck | H04W 4/90 |
| | | | 455/404.2 |
| 2014/0282786 A1* | 9/2014 | Lajoie | H04N 21/2743 |
| | | | 725/115 |
| 2014/0364081 A1* | 12/2014 | Rauner | H04L 12/1895 |
| | | | 455/404.2 |

OTHER PUBLICATIONS

Igotya, "Anti-theft for iPhone & Android" last accessed on Jan. 28, 2014, 1 page.
Careers 2.0, Stackflow, "Password Required to Power Off Android Device", dated Aug. 10, 2012, 2 pages.
U.S. Appl. No. 13/855,503, filed Apr. 2, 2013, Office Action, dated Nov. 26, 2014.
U.S. Appl. No. 13/855,503, filed Apr. 2, 2013, Office Action, dated Jun. 19, 2015.
U.S. Appl. No. 13/855,503, filed Apr. 2, 2013, Office Action, dated Apr. 21, 2016.
U.S. Appl. No. 13/855,503, filed Apr. 2, 2013, Interview Summary, dated Sep. 22, 2015.
U.S. Appl. No. 13/855,503, filed Apr. 2, 2013, Interview Summary, dated May 8, 2015.
U.S. Appl. No. 13/855,503, filed Apr. 2, 2013, Final Office Action, dated Nov. 20, 2015.
U.S. Appl. No. 13/855,503, filed Apr. 2, 2013, Final Office Action, dated Oct. 20, 2016.
U.S. Appl. No. 13/686,880, filed Nov. 27, 2012, Notice of Allowance, dated Feb. 1, 2016.
D'sa, U.S. Appl. No. 13/855,503, filed Apr. 2, 2013, Notice of Allowance, dated Mar. 10, 2017.

* cited by examiner

TECHNIQUES FOR RECOVERING MISSING DEVICES

PRIORITY CLAIM

This application claims the benefit under 35 U.S.C. § 120 as a divisional of U.S. patent application Ser. No. 13/855,503, filed on Apr. 2, 2013. The entire content of the foregoing application is hereby incorporated by reference as if fully set forth herein.

FIELD OF THE INVENTION

The present invention relates to mobile devices and, more specifically, to techniques for recovering mobile devices.

BACKGROUND

Mobile devices, such as mobile phones, tablets, MP3 players, personal digital assistants, laptop computers, etc. have come to play a significant role in modern life. Unfortunately, the mobility that makes these devices so useful also makes them prone to loss and theft.

Various techniques have been developed to help recover mobile devices that have been lost or stolen ("missing devices"). For example, some mobile devices have the ability to obtain and communicate their current location. This ability has been leveraged to allow other devices to request the current location of missing devices. Specifically, using one device, a user may send a request to a service to find the location of a missing device. In response to the request, the service sends a request to the missing device to obtain the current location of the missing device. Assuming that the missing device is on and reachable by the service, the missing device communicates its current location to the service. The service then communicates the location information to the requesting device. The requesting device may, for example, display the current location of the missing device on a map. The user may then use the location information to hunt down the missing device.

Unfortunately, the value of such services is diminished by the fact that thieves can prevent the devices they steal from communicating with such services by immediately powering down the devices. If a thief is able to power down a device before the owner is able to send a request to the device locator service, then the owner will be unable to locate the missing device.

Various techniques may be used to prevent thieves from powering down the devices they steal. For example, a mobile device may be designed to power down only after a password has been provided. Assuming that the thief does not know the power-down password, the owner of a stolen device will be able to query the location of the stolen device until the device becomes disabled. The device may become disabled in a variety of ways, such as running out of battery life, being shielded from wireless communications, or being partially or completely destroyed.

Assuming that the owner of a missing device is able to quickly become aware that the device is missing, the additional time that a power-down password affords the owner may be enough for the owner to query the location of the device before the device becomes disabled. However, owners do not always become aware of their missing devices right away. Therefore, it is desirable to provide techniques for recovering mobile devices that may help both in situations where owners quickly become aware of missing devices, and situations in which they do not.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
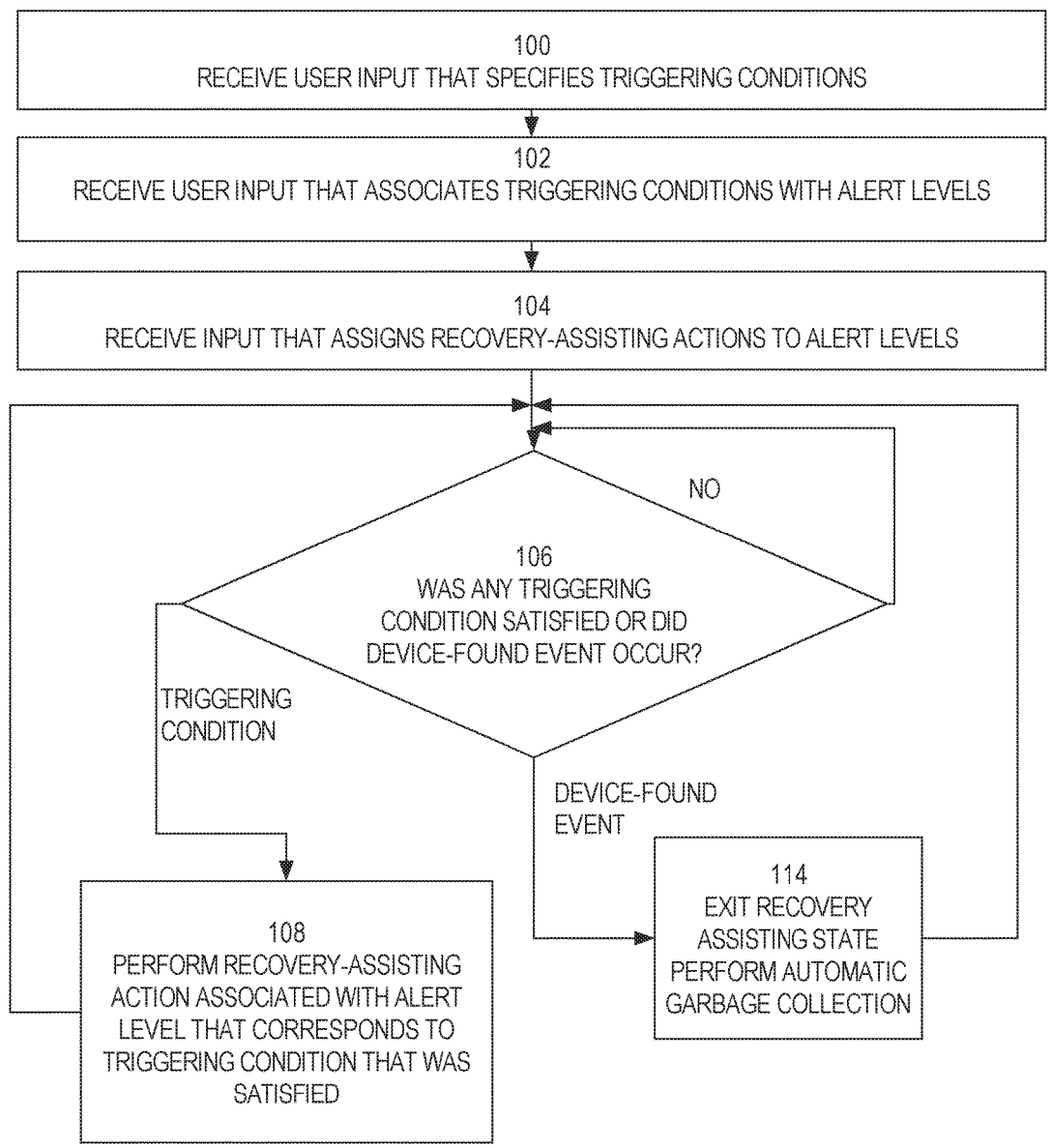
FIG. 1 is a flowchart illustrating steps performed by a device to assist recovery of the device, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for assisting owners to recover missing devices. The techniques involve causing the missing device to automatically perform certain actions proactively in response to detecting conditions that indicate that the device has been lost or stolen. Conditions that indicate the device has been lost or stolen are referred to herein as "triggering conditions" and may include, for example, that a password failure has occurred more than a predetermined number of times.

An action automatically performed in response to the detection of triggering conditions is referred to herein as a "recovery-assisting action". As shall be described hereafter, any number and type of recovery-assisting actions may be taken, in response to triggering conditions, to assist owners in recovering a missing device. For example, in response to the triggering conditions, a device may generate a record that indicates the current location of the device, and synchronize the record with at least one other device. In one embodiment, the generation and synchronization of such records may be repeated on a periodic basis until either (a) the device becomes disabled, or (b) a user enters an appropriate password.

Triggering Conditions

As mentioned above, "triggering conditions" refers to any conditions that indicate that a device is lost or stolen. Thus, triggering conditions may include, for example, incorrect entry of a log-in password, or incorrect entry of a power-down password. In some embodiments, a single failed attempt to log-in may not be sufficient. In such embodiments, the triggering conditions may be that more than a predetermined number of log-in attempts have failed.

Triggering conditions may also be based on things other than the use of incorrect passwords. For example, in one embodiment, triggering conditions may be that the current location of the device is outside a specified area, or that the time that the device has been outside a specified area has exceeded some threshold.

As another example, the device may have a touch-sensitive surface capable of detecting finger prints. For such a device, a triggering condition may be detecting, on the touch-sensitive surface, finger prints that do not match any "known" finger prints that have been registered with the device. Finger prints are merely one type of bio-characteristic that a device can use to identify a user. Other embodiments may use other bio-characteristics, such as the way a user holds the device, the way a user moves his/her fingers when interacting with a touch-sensitive screen, etc. The triggering condition may be detecting any bio-characteristic reading that does not appear to be consistent with the bio-characteristic readings of the owner.

As yet another example, the device may have a "hard reset" button, and the triggering conditions may be any attempt to activate the hard reset button, or an attempt to activate the hard reset button without providing an appropriate password. Similarly, any attempt to power down a device may be a triggering condition, even in situations where the device does not require a power down password.

If a device is stolen, there is a chance that the thief will attempt to use the device on a network that was not known to the owner. Thus, triggering conditions may include, for example, an attempt to connect the device to a network that is not already known to the device.

Thieves may also attempt to "jailbreak" a stolen device. Typically, jailbreaking a device involve connecting to the device with a physical cord. Thus, triggering conditions may include detection of an attempt to physically connect a cord to the device.

Devices may also be designed with mechanisms for detecting attempts to open or dismantle the devices. For example, a device may have an internal spring, lever or button that is activated by attempts to open or dismantle the device. As another example, a device may have a mechanism for detecting attempts to swap or remove a battery, a SIMM card, etc. With such devices, the triggering conditions may include any activation of such mechanisms.

For devices that include mechanisms for detecting motion, such as accelerometers, a triggering condition may be that a violent motion was detected. For example, if the reading of an accelerometer exceeds a certain threshold, then the device may have fallen out of its owner's pocket, or been swiped by a fleeing thief. In response to detecting that the accelerometer exceeds the threshold, the device may automatically perform recovery-assisting actions.

In one embodiment, the triggering conditions may vary based on the time of day, or day of week. For example, the triggering condition for a mobile device may be that, on a weekday, between the hours of 9 am and 5 pm, the device is located more than 10 miles from the workplace of the owner.

According to one embodiment, the triggering conditions may be arbitrarily complex, taking into account a variety of factors. For example, the triggering condition for a device may be:
 on any day, three failed log-in attempts anywhere,
 on any day, one failed power-down attempt anywhere,
 on a weekday, during work hours, one failed password attempt more than a mile from work,
 on any day, battery level falls below 5%, OR
 on any day, unrecognized fingerprints are detected on a touch-sensitive surface of the device In one embodiment, a user is presented with a user interface that allows the user to specify the triggering conditions for the device. The options presented by the interface may vary based on the capability of the device. For example, a device that is not capable of detecting finger prints would not allow the user to specify a condition that is based on finger print detections. Similarly, a device that does not support power-down passwords would not allow the user to specify a condition that is based on incorrect entry of the power-down password.

Figure 2:
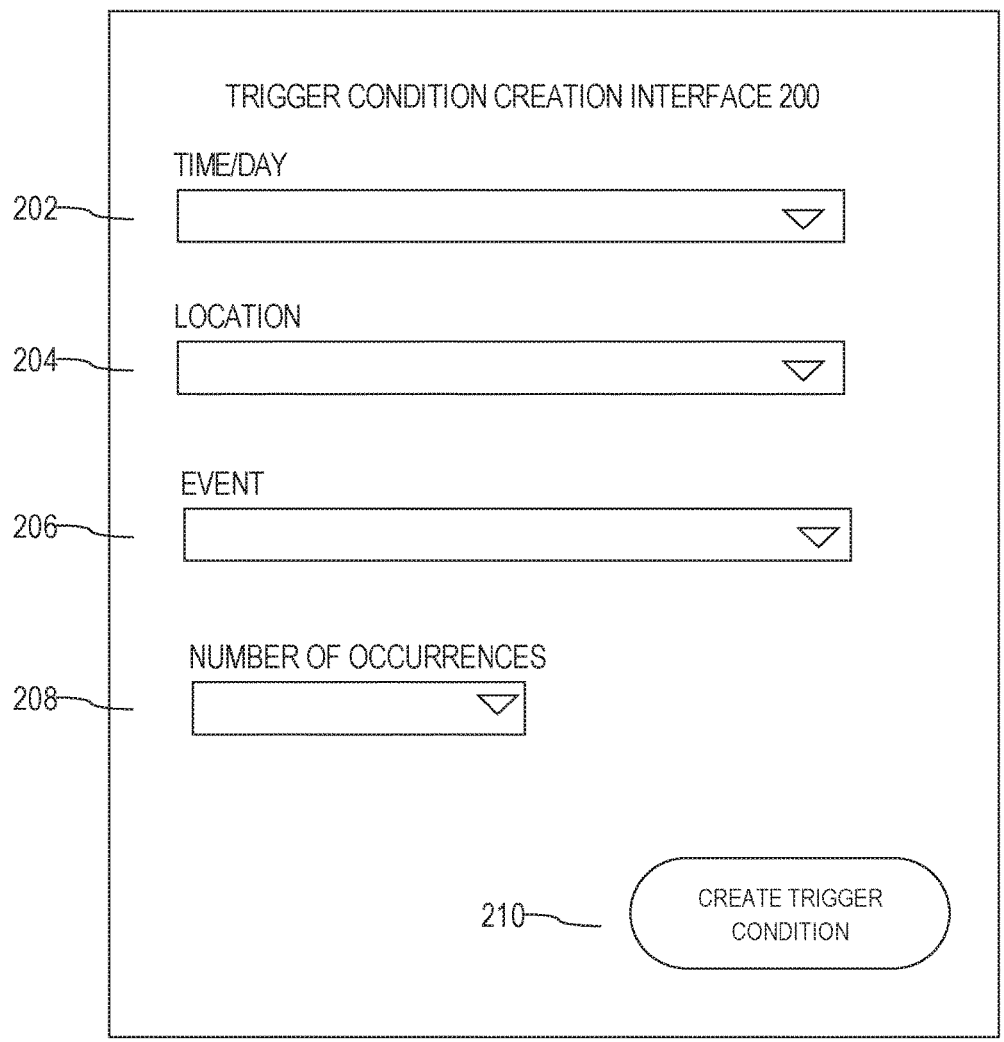
FIG. 2 is a block diagram that illustrates an interface that may be presented to a user to facilitate the specification of trigger conditions, according to an embodiment.

FIG. 2 is a block diagram that illustrates an interface 200 that may be presented to a user to facilitate the specification of trigger conditions. Referring to FIG. 2, the interface 200 includes controls 202, 204, 206 and 208 that respectively allow the user to specify a time/day for the trigger condition, a location for the trigger condition, an event for the trigger condition, and the number of occurrences that the event must occur before the trigger condition is satisfied. For example, to specify the trigger condition "on any day, three failed log-in attempts anywhere", control 202 would be used to specify "any time", control 204 would be used to specify "any place", control 206 would be used to specify "failed log-in attempts", and control 208 would be used to specify "3". Upon setting controls 202, 204, 206, and 208, control 210 may be activated to store, within the device, a record that defines the trigger condition.

Recovery-Assisting Actions

As mentioned above, any number and type of recovery-assisting actions may be performed in response to detecting the triggering conditions. In general, recovery-assisting actions should allow the owner of a missing device to obtain information that will help the owner recover the missing device. In one embodiment, the information relates to the location of the missing device, as detected by the missing device itself.

For example, upon detection of the triggering conditions, a device with components for receiving a GPS or other location-indicating signal may use those components to identify the current location of the device. After obtaining the current-location information, the device may make that information available to the owner in a variety of ways. For example, in one embodiment, the device automatically sends a text message that contains its current location to another device of the owner. In another embodiment, the device sends the location information to an online service that makes the information accessible to the owner. In yet another embodiment, the device stores the location information as a record in a collection that is synchronized with an online service, or with one or more other devices of the owner.

The manner in which information is communicated during the recovery-assisting actions may be based on the communication capabilities of the device. For example, if the device is capable of placing voice phone calls, then the device may make an automated call to a pre-determined phone number. Similarly, devices capable of sending texts may send texts, devices capable of sending email may send email, and devices capable of syncing content items (such as files) with an online service or other devices may automatically store content items with the information to cause the information to be synchronized with the online service and/or other devices. A device that is capable of multiple forms of communication may communicate the information in several ways in parallel. In one embodiment, a user is provided a user interface with controls that allow the user to specify the method(s) by which the device communicates information during the recovery-assisting actions.

Some online services allow users to locate missing devices with other devices. For example, using device X, a user may request the location of a missing device Y from such an online service. In response to the request, the online service sends a request to device Y for the current location of device Y. If device Y is turned on and connected to the online service, then device Y responds with its current location. The current location of device Y may then be stored at the online service, and communicated to device X. To make use of such online services, a device may be configured to respond to triggering conditions by sending a request, to an online service, for its own location. That is, device Y may ask the online service for the current location of device Y. In response to receiving the request, the online service may ask device Y for its current location. Upon being provided the current location of device Y, the online service may store the location information (as well as send the information back to device Y). Subsequently, another device (e.g. device X) may be used to retrieve the location information from the online service. Thus, the location information of device Y may be available at the online service even after device Y becomes disabled.

Recovery-assisting actions may communicate other information instead of, or in addition to, location information. For example, in one embodiment, in response to the triggering conditions the device may be configured to automatically take one or more photos. As another example, in response to the triggering conditions, the device may be configured to automatically record the finger prints of all users that touch its touch-sensitive surfaces. Similar to the location information, any additional information may be conveyed by sending a text, an email, an instant message, or by placing the content items that contain the information in a collection whose content is synchronized with an online service and/or one or more other devices.

Figure 3:
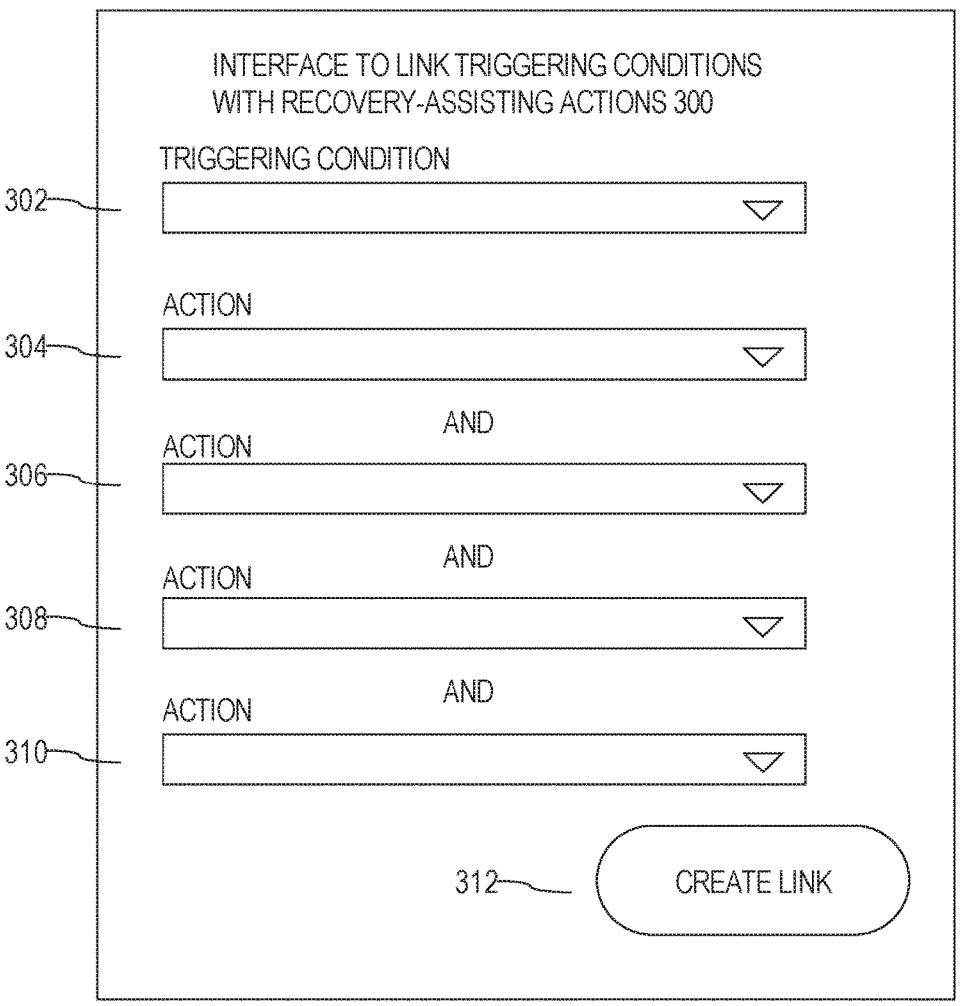
FIG. 3 is a block diagram that illustrates an interface that allows user to specify which recovery-assisting actions to take in response to occurrence of each triggering condition, according to an embodiment.

FIG. 3 is a block diagram that illustrates an interface 300 that allows users to specify which recovery-assisting actions to take in response to occurrence of each triggering condition. Referring to FIG. 3, control 302 allows the user to select a triggering condition. For example, control 302 may be a drop down menu that allows the user to select a triggering condition that the user defined using interface 200, described above. After selecting a triggering condition, controls 304, 306, 308 and 310 allow the user to associate recovery-assisting actions with the selected triggering condition. For example, control 304 may be a drop-down menu through which the user selects "store current location in a synchronized collection". Control 306 may be a drop-down menu through which the user selects "send a text to XXX-XXX-XXXX", where XXX-XXX-XXXX is a phone number provided by the user.

After the user has specified the actions to associate with the selected triggering condition, the user may press the "create link" button 312 to cause the device to store a record that associates the selected triggering condition with the selected actions. Based upon such records, the device monitors for the triggering conditions and, when they occur, causes the associated actions to be performed.

The specific list of actions that are made available for selection may vary from device to device, based on the capabilities of the device. In addition, while interface 300 illustrates controls for associating up to four actions with a triggering condition, there is no limit to the number or type of actions that can be associated with a triggering condition. Further, the controls for specifying actions may be simple drop-down menus as shown, or may be much more sophisticated to allow for the specification of arbitrarily complex actions, such as repeatedly sending location records every 5 minutes except when the device is not moving faster than 10 miles per hour.

Recovery-Assisting State

As mentioned above, in response to triggering conditions, a device may automatically and immediately perform certain actions. Instead of or in addition to such immediately-performed actions, the device may enter a "recovery-assisting state" in which one or more aspects of the device function differently. For example, while in the recovery-assisting state, the device may periodically (e.g. every 5 minutes) report its current position to an online service. Alternatively, while in the recovery-assisting state, the device may periodically save a record, containing the device's current location, to a collection that is synchronized with one or more other devices.

Other aspects of the device's operation may also be altered in the recovery-assisting state. For example, to preserve battery life, the device may turn off all non-essential apps and enter a low-power mode. While in the low-power mode, the device may be configured to only (a) perform recovery-assisting actions, and (b) prompt for a password to exit the recovery-assisting state. Upon entry of the appropriate password, the device leaves the recovery-assisting state and operates normally.

The location information that is communicated by the device during the recovery-assisting state is more useful when the device is stationary than when the device is moving. For example, if the device is stolen and the thieves are driving to a warehouse, the location of the warehouse would be more useful than the location of the device while the thieves are travelling. Therefore, in one embodiment, some or all of the recovery-assisting actions may be suppressed in response to detecting that the device is moving. Once the device stops for more than a predetermined amount of time (e.g. five minutes), the device may resume performing the recovery-assisting actions.

Exiting the Recovery-Assisting State

While the triggering conditions are intended to be conditions that indicate that a device is lost or stolen, it is possible for triggering conditions to occur when a device is not missing. When a device that is not missing is in the recovery-assisting state, the owner of the device will want to exit the recovery-assisting state to be able to use the device normally. Further, even if a device was missing, once found, the owner will want to be able to use the device normally. Therefore, according to one embodiment, various techniques are provided for exiting the recovery-assisting state to re-enter normal operation.

In one embodiment, exiting the recovery-assisting state may simply involve providing an appropriate password. The password to exit the recovery-assisting state may be the same as the log-in password, the power-down password, or may be an entirely different password. According to one embodiment, the device is configured to ask the user a question about content of one or more content items or collections on the device. In response to correctly answering the question about the content, the device exits the recovery-assisting state and begins normal operation. In one embodiment, the device stores a profile about the user, and to exit the recovery-assisting state the user is prompted with a question that is derived from the profile.

The same technique that is used to authorize exit of the recovery-assisting state may be used in other situations. For example, in response to a request to power-down a device, the device may prompt the user with a question derived from content stored on the device. If the content-specific question is not answered correctly within a certain number of tries and/or within a certain amount of time, then the recovery-assisting state may be initiated and/or specific recovery-assisting actions may be immediately taken.

Levels of Alert

While all triggering conditions are used to detect that a device is lost or stolen, the likelihood that a device is lost or stolen is different for different triggering conditions. For example, one triggering condition may be that the device is moved more than a mile from the owner's workplace during working hours of a work day. While these conditions may indicate that the device has been lost or stolen, it is also very possible that the owner simply went out to lunch. On the other hand, another triggering condition may be that someone has entered the wrong power-down password five times in a row. Under those triggering conditions, the likelihood that the device has been lost or stolen is quite high.

Therefore, according to one embodiment, each triggering condition may be associated with a distinct level of alert, where different levels of alert cause different recovery-assisting actions. For example, detecting that the device is outside a work area during normal working hours may raise a level one alert. The level one alert may be mapped to the recovery-assisting action of storing a small content item that indicates the current location of the device in a collection on the device that is automatically synchronized with an online service or other devices. On the other hand, detecting that a user has entered the wrong power-down password five times in a row may raise a level five alert. The level five alert may be mapped to the recovery-assisting actions of sending the current location of the device by text, instant message, and an audible voice call, and placing the device in a low-powered mode during which the device periodically stores a content item with the device's current location in a collection that is synchronized with other devices.

In one embodiment, the level of alert affects the amount of resources used by the corresponding recovery-assisting actions. For example, a triggering condition associated with a level one alert has a relatively low likelihood that the device is missing. Consequently, the level one alert may be associated with actions that consume very little overhead. For example, a level one alert may simply cause a very small content item that indicates "possible theft" to be stored in a collection that is synchronized with an online service or other devices. A level two alert, on the other hand, may cause the device to determine its current location, and store that location in a small content item in a synchronized collection. As the level of alert increases, so does the amount of overhead to communicate to the user. For example, a level five alert (e.g. caused by repeated incorrect entry of the power-down password) may cause the device to vibrate, emit an audible alarm, store a content item with the current location to a synchronized collection, take photos every 20 seconds and text them to another device, etc.

Garbage Collection

Some recovery-assisting actions generate data which, after the device is recovered, serves little purpose. For example, if content items are stored in a synchronized collection every time a level one alert is triggered, and the triggering conditions for the level one alert are frequently satisfied, then the synchronized collection may quickly fill with location-indicating content items. This would be the situation, for example, if the triggering condition is that the device is located outside a certain area, and the corresponding recovery-assisting action is storing a location-indicating content item once every five minutes until an appropriate password is provided.

To avoid continued use of resources by such content items, in one embodiment garbage collection operations are triggered automatically in response to a "device-found" event. A device-found event is any event, detected by the device, that indicates that the device is under the control of the owner. For example, a device-found event may be entry of the correct power-down password. As another example, a device-found event may be receiving the correct answer to content-based questions automatically generated based on content within the device. As yet another example, a device-found event may be receiving, from an online service, an indication that the owner is in possession of the device.

In response to a device-found event, the device automatically performs a garbage collection action that recovers resources consumed as a result of the recovery-assisting actions. For example, if the recovery-assisting actions included storing location-indicating content items in a synchronized collection, then the garbage collection action may be to delete those content items on the device, thereby causing them to be deleted on all other devices/services with which the device is synchronized. Similarly, any photos taken automatically as a result of recovery-assisting actions may be automatically deleted in response to a device-found event. In one embodiment, occurrence of a device-found event may also trigger the device to send "device found" messages to all devices to which messages had been sent as a result of the recovery-assisting actions. Thus, a device that received a text indicating "I may be stolen/lost" because another device detected triggering conditions may also receive a text indicating "I am found" when the other device detects a device-found event.

Example Process

Referring to FIG. 1, it is a flowchart that depicts performed to assist in the recovery of a device, according to one embodiment. Steps 100, 102 and 104 involve setting up a device to perform recovery-assisting actions under the right conditions. Specifically, at step 100, the device receives user input that specifies triggering conditions. As mentioned above, the user may specify any number and type of triggering conditions, including but not limited to the several examples given above.

During step 102, each of the conditions specified in step 100 is associated with an alert level. The alert level with which a triggering condition is associated would typically be based on how likely the triggering condition indicates that the device has been lost or stolen. For example, the detection of an abrupt movement of the device may be associated with an alert level one, while detecting an attempt to open or disable the device may be associated with an alert level five.

At step 104, recovery-assisting actions are assigned to alert levels. In general, the lower the alert level, the less drastic the recovery-assigning action. For example, alert level one may be associated with storing a content item in a synchronized collection, whereas alert level five may be associated with sending a text, email, and instant message indicating the current location of the device, and entering a recovery assisting state in which the location of the device is resent every five minutes.

It should be noted that, while steps 100, 102 and 104 represent an embodiment where a user controls the recovery-assisting functions of the device, in an alternative embodiment, devices may simply be pre-configured with recovery-assisting functions. For example, a device may be hard-coded to detect certain triggering conditions, and to perform certain recovery-assisting actions when those conditions are satisfied.

Once a device has been configured, either by the user or by the device manufacturer, control passes to step 106 where the device, during normal operation, monitors conditions to determine whether (a) any of the triggering conditions are satisfied, or (b) any device-found event occurs. If a triggering condition is satisfied, control proceeds to step 108. If a device-found even occurs, control proceeds to step 114. Otherwise, if neither are true, control loops back to 106, and monitoring continues.

In response to a triggering condition being satisfied, at step 108 the device performs the recovery-assisting action(s) associated with the alert level that corresponds to the triggering condition that was satisfied. For example, if the device experienced a violent shake, and violent shakes have been associated with alert level one, then in step 108 the device performs the recovery-assisting actions that are associated with alert level one. Depending on how the device has been configured, the recovery-assisting actions performed in step 108 may include putting the device in a recovery-assisting state during which the device performs certain actions periodically (e.g. places a content item with the devices current location in a synchronized collection every five minutes).

After the device performs the recovery-assisting actions, control proceeds back to step 106, in which the device once again monitors conditions to determine whether (a) any of the triggering conditions are satisfied, or (b) any device-found event occurs.

As mentioned above, in response to a device-found event, control proceeds to step 114. At step 114, if the device is in the recovery-assisting state, then the device exits the recovery-assisting state. In addition, the device performs automatic garbage collection to reclaim any resources that were consumed by any previously-executed recovery-assisting actions. For example, in response to the owner entering the correct password, the device may exit the recovery-assisting state (i.e. resume normal operation), and delete any content items that were placed in a synchronized collection as part of recovery-assisting actions. In addition, the device may delete any photos, fingerprints, etc. that where acquired as part of the recovery-assisting actions.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
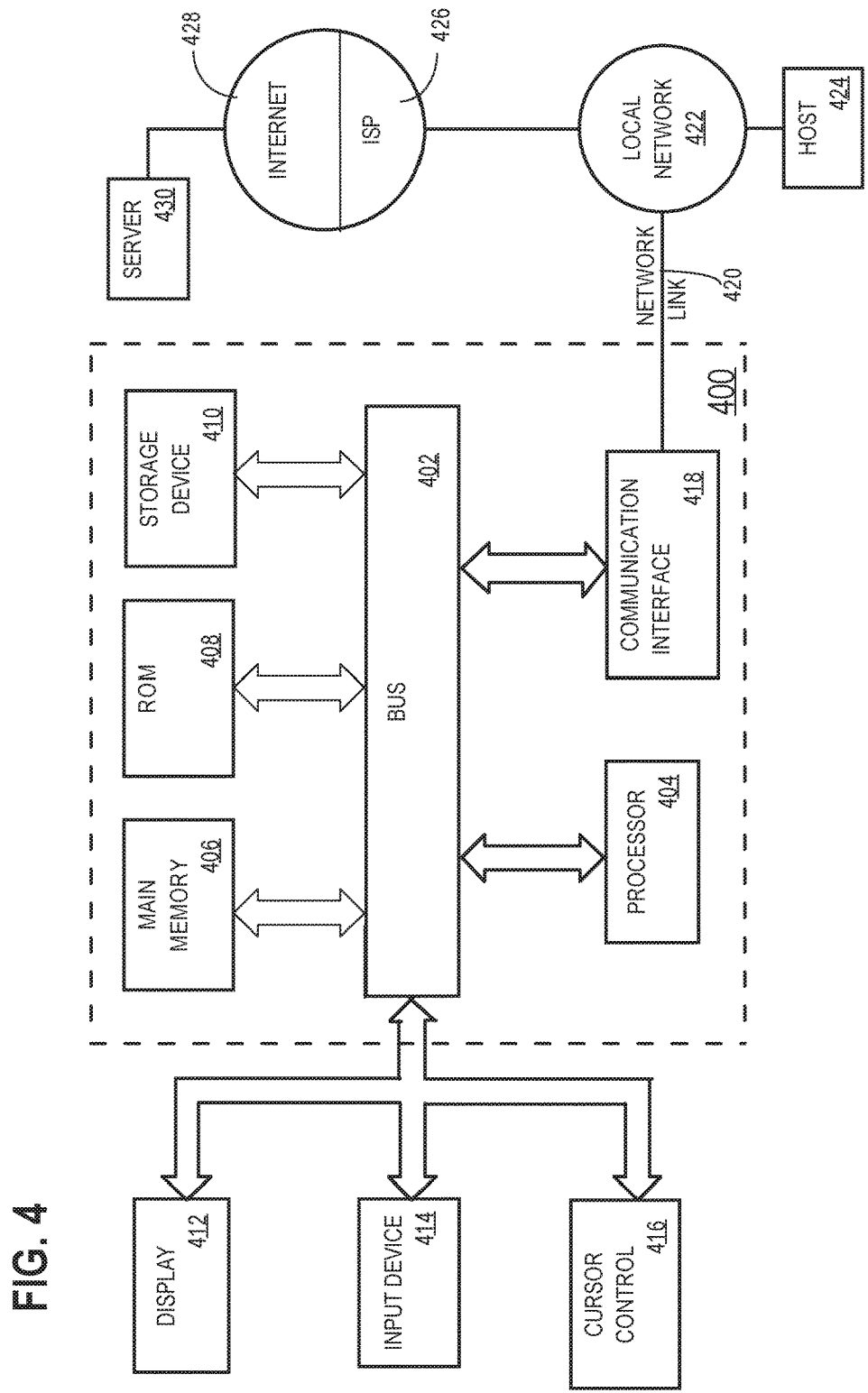
FIG. 4 is a block diagram of a computer system upon which embodiments of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hardwired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   receiving, at a particular device, user input that selects for each triggering condition, of a plurality of triggering conditions, a corresponding alert level, of a plurality of different alert levels;
   wherein each triggering condition, of the plurality of triggering conditions, represents a likelihood that the particular device is lost or stolen;
   receiving, at the particular device, user input that associates each alert level, of the plurality of different alert levels, with one or more respective recovery-assisting actions;
   wherein a first alert level, of the plurality of different alert levels, is associated with a first set of the one or more respective recovery-assisting actions;
   wherein a second alert level, of the plurality of different alert levels, is associated with a second set of the one or more respective recovery-assisting actions;
   wherein the first set of the one or more respective recovery-assisting actions is different from the second set of one or more respective recovery-assisting actions; and
   in response to the particular device detecting that a particular triggering condition, of the plurality of triggering conditions, is satisfied, the particular device automatically performing the steps of:
   determining an alert level, from the plurality of different alert levels, that corresponds to the particular triggering condition; and
   based on determining the alert level, from the plurality of different alert levels, that corresponds to the particular triggering condition, performing one or more particular recovery-assisting actions that are associated with the alert level that corresponds to the particular triggering condition.

2. The method of claim 1, further comprising:
   after performing the one or more particular recovery-assisting actions, the particular device detecting occurrence of a device-found event; and
   in response to detecting occurrence of the device-found event, automatically performing a garbage collection action to recover at least one resource consumed by performing the one or more particular recovery-assisting actions.

3. The method of claim 2, wherein the one or more particular recovery-assisting actions include creation of a particular content item on the particular device, and the garbage collection action includes deletion of the particular content item.

4. The method of claim 1,
wherein a lower alert level of the plurality of different alert levels corresponds to one or more first triggering conditions that represent a lower likelihood that the particular device is lost or stolen than one or more second triggering conditions that correspond to a higher alert level;
wherein, if the alert level is the higher alert level, the performing of the one or more particular recovery-assisting actions causes the particular device to consume greater amount of computing resources than if the alert level is the lower alert level.

5. The method of claim 1, further comprising:
in response to the particular device detecting that an additional triggering condition, of the plurality of triggering conditions, is satisfied after detecting the particular triggering condition was satisfied, the particular device automatically performing one or more additional recovery-assisting actions that are associated with a particular alert level that corresponds to the additional triggering condition.

6. The method of claim 1, further comprising:
in response to the particular device detecting that an additional triggering condition, of the plurality of triggering conditions, is satisfied after detecting the particular triggering condition was satisfied, the particular device automatically modifying the alert level to a higher alert level that corresponds to the additional triggering condition; and
wherein the additional triggering condition is a condition indicating a higher likelihood that the particular device is lost or stolen than the particular triggering condition.

7. The method of claim 6, further comprising:
the particular device automatically performing one or more additional recovery-assisting actions that are associated with the higher alert level.

8. The method of claim 1, wherein the performing the one or more particular recovery-assisting actions that are associated with the alert level that corresponds to the particular triggering condition provides a recovery-assisting indication to a user of another device that the particular device may be lost or stolen.

9. The method of claim 1, wherein the plurality of triggering conditions includes at least one or more of:
the particular device having experienced an abrupt movement,
an attempt to open or dismantle the particular device, or
a certain number of failed attempts to power down the particular device.

10. The method of claim 1, wherein automatically performing the one or more particular recovery-assisting actions includes one or more of:
obtaining, by the particular device, at least one of a current location of the particular device, a finger print of a user of the particular device, or a photo taken by the particular device, or
the particular device entering a low power mode in which one or more functions of the particular device are disabled.

11. The method of claim 1, further comprising:
determining whether the particular device is moving; and
only automatically performing the one or more particular recovery-assisting actions if the particular device is not moving.

12. The method of claim 1, wherein the performing the one or more particular recovery-assisting actions that are associated with the alert level that corresponds to the particular triggering condition is based, at least in part, on
the particular device automatically creating, at a first time, a particular content item in a synchronized collection of content items, at the particular device, that, at a second time that is later than the first time, is automatically synchronized with an online service.

13. A device comprising:
one or more processors;
one or more non-transitory computer-readable media coupled to the one or more processors and storing one or more sequences of instructions which, when executed by the one or more processors, cause the one or more processors to perform:
receiving, at the device, user input that selects for each triggering condition, of a plurality of triggering conditions, a corresponding alert level, of a plurality of different alert levels;
wherein each triggering condition, of the plurality of triggering conditions, represents a likelihood that the device is lost or stolen;
receiving, at the device, user input that associates each alert level, of the plurality of different alert levels, with one or more respective recovery-assisting actions;
wherein a first alert level, of the plurality of different alert levels, is associated with a first set of the one or more respective recovery-assisting actions;
wherein a second alert level, of the plurality of different alert levels, is associated with a second set of the one or more respective recovery-assisting actions;
wherein the first set of the one or more respective recovery-assisting actions is different from the second set of one or more respective recovery-assistant actions; and
in response to the device detecting that a particular triggering condition, of the plurality of triggering conditions, is satisfied, the device automatically performing the steps of:
determining an alert level, from the plurality of different alert levels, that corresponds to the particular triggering condition; and
based on determining the alert level, from the plurality of different alert levels, that corresponds to the particular triggering condition, performing one or more particular recovery-assisting actions that are associated with the alert level that corresponds to the particular triggering condition.

14. The device of claim 13, wherein the one or more sequences of instructions further cause the one or more processors to perform:
after performing the one or more particular recovery-assisting actions, detecting occurrence of a device-found event; and
in response to detecting occurrence of the device-found event, automatically performing a garbage collection action to recover at least one resource consumed by performing the one or more particular recovery-assisting actions.

15. The device of claim 13,
wherein a lower alert level of the plurality of different alert levels corresponds to one or more first triggering conditions that represent a lower likelihood that the device is lost or stolen than one or more second triggering conditions that correspond to a higher alert level;

wherein, if the alert level is the higher alert level, the performing of the one or more particular recovery-assisting actions causes the device to consume greater amount of computing resources than if the alert level is the lower alert level.

16. The device of claim 13, wherein the one or more sequences of instructions further cause the one or more processors to perform:

in response to detecting that an additional triggering condition, of the plurality of triggering conditions, is satisfied after detecting the particular triggering condition was satisfied, automatically performing one or more additional recovery-assisting actions that are associated with a particular alert level that corresponds to the additional triggering condition.

17. The device of claim 13, wherein the one or more sequences of instructions further cause the one or more processors to perform:

in response to detecting that an additional triggering condition, of the plurality of triggering conditions, is satisfied after detecting the particular triggering condition was satisfied, automatically modifying the alert level to a higher alert level that corresponds to the additional triggering condition; and wherein the additional triggering condition is a condition indicating a higher likelihood that the device is lost or stolen than the particular triggering condition.

18. The device of claim 13, wherein the performing the one or more particular recovery-assisting actions that are associated with the alert level that corresponds to the particular triggering condition provides a recovery-assisting indication to a user of another device that the device may be lost or stolen.

19. The device of claim 13, wherein the plurality of triggering conditions includes at least one or more of:

the device having experienced an abrupt movement, an attempt to open or dismantle the device, or a certain number of failed attempts to power down the device.

20. The device of claim 13, wherein automatically performing the one or more particular recovery-assisting actions includes one or more of:

obtaining, by the device, at least one of a current location of the device, a finger print of a user of the device, or a photo taken by the device, or entering a low power mode in which one or more functions of the device are disabled.

* * * * *